United States Patent [19]

Buell

[11] Patent Number: 4,951,774

[45] Date of Patent: Aug. 28, 1990

[54] COMBINATION MOTORCYCLE FRAME AND FUEL TANK

[75] Inventor: Erik Buell, Mukwonago, Wis.

[73] Assignee: Buell Motor Company, Inc., Mukwonago, Wis.

[21] Appl. No.: 294,282

[22] Filed: Jan. 6, 1989

[51] Int. Cl.⁵ ............................................. B62K 11/04
[52] U.S. Cl. ................................... 180/225; 180/219; 280/835
[58] Field of Search ............... 280/835; 180/225, 69.4, 180/219

[56] References Cited

U.S. PATENT DOCUMENTS

| 3,252,537 | 5/1966 | Tarran | 180/225 |
| 4,311,261 | 1/1982 | Anderson et al. | 280/835 X |
| 4,461,489 | 7/1984 | Tsukiji et al. | 180/225 X |
| 4,585,086 | 4/1986 | Hiramatsu | 180/219 |

FOREIGN PATENT DOCUMENTS

| 0218493 | 4/1987 | European Pat. Off. | 180/219 |
| 2843020 | 4/1980 | Fed. Rep. of Germany | 280/835 |
| 1121317 | 8/1956 | France | 180/225 |

Primary Examiner—Charles A. Marmor
Assistant Examiner—Wook Yoon
Attorney, Agent, or Firm—Andrus, Sceales, Starke & Sawall

[57] ABSTRACT

A combined motorcycle frame and fuel tank utilizes a pair of hollow beams to form the main chassis of the motorcycle. The hollow interior of the framework is utilized as a fuel tank for the motorcycle.

9 Claims, 2 Drawing Sheets

COMBINATION MOTORCYCLE FRAME AND FUEL TANK

BACKGROUND OF THE INVENTION

The present invention relates to a fuel tank for a motorcycle and more specifically to a motorcycle frame that also serves as the fuel tank for the motorcycle.

Recently, it has become popular to utilize dual beams for the motorcycle framework. This type of frame utilizes two substantially parallel hollow thin-walled beams of large cross section as the main chassis members between the front and rear wheel suspension. This type of frame is simple to manufacture and provides a substantial amount of rigidity for the chassis. The disadvantage to this type of construction is that the frame takes up a great deal of space on the motorcycle where space is at a premium. Also, the fuel tank is usually mounted separately to the top of the frame which consumes additional space.

The present invention addresses these space needs by utilizing the hollow dual beam frame as the fuel tank for the motorcycle. This significantly reduces the size or even eliminates the need for a separate fuel tank.

SUMMARY OF THE INVENTION

A combined motorcycle frame and fuel tank includes first and second hollow beam members that comprise the left and right hand side of the main chassis of the motorcycle.

In accordance with one aspect of the invention, the combined motorcycle frame and fuel tank is provided with a hollow cross member that connects the two beam members and provides communication between the interior of these members.

In accordance with yet another aspect of the invention, a fuel inlet port is disposed in one of the members so that fuel may be introduced into the interior of the framework.

In accordance with still another aspect of the invention, a fuel outlet port is disposed in one of the members so that fuel may be removed from the interior of the framework and delivered to the motorcycle engine.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
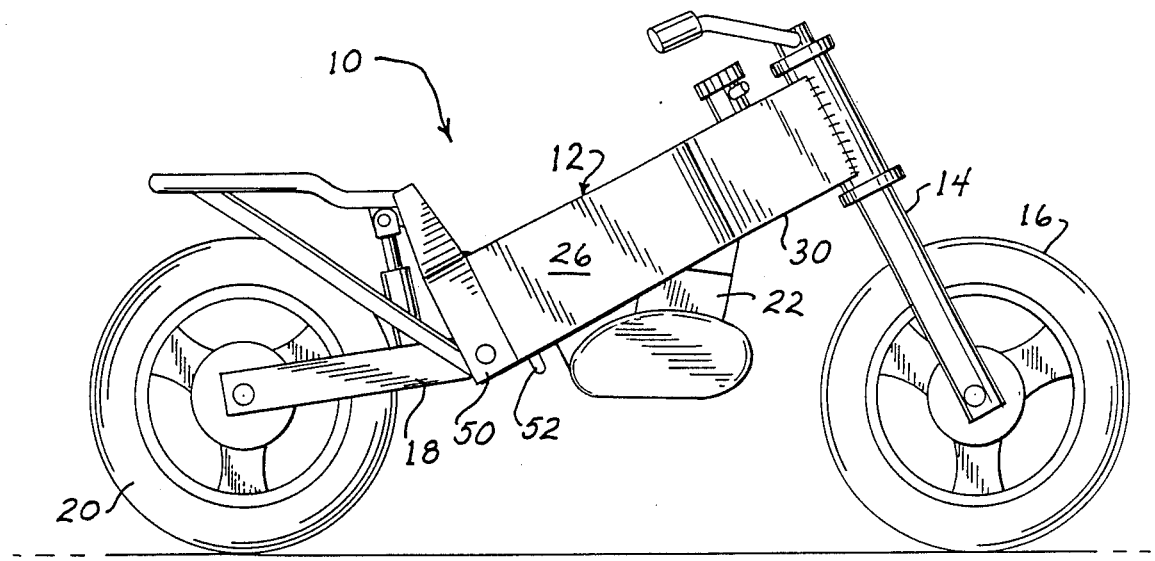
FIG. 1 is a side view of a motorcycle constructed according to the present invention.

FIG. 1 illustrates a motorcycle 10 constructed with the dual beam-type framework. In this type of construction, a hollow thin walled dual beam main chassis 12 connects the front telescoping fork 14 bearing front wheel 16 with the rear swing arm 18 bearing rear wheel 20. Engine 22 is disposed beneath and between the parallel beam members of dual beam chassis 12.

Figure 2:
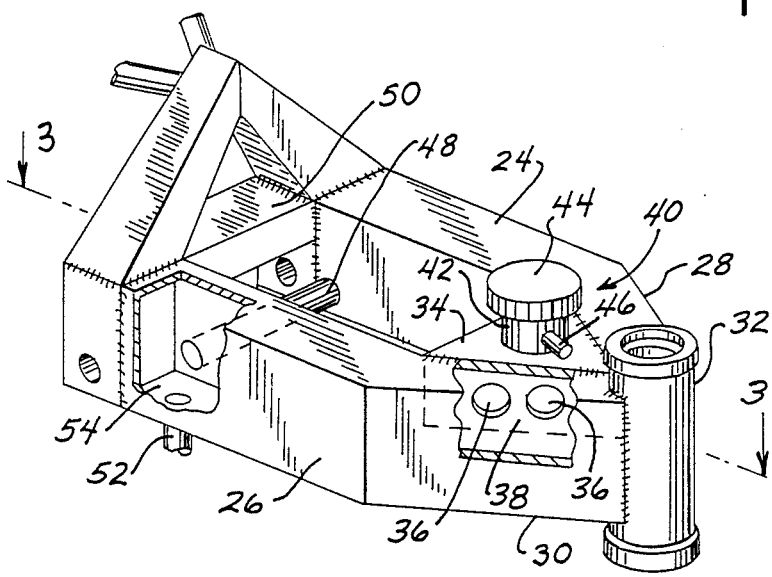
FIG. 2 is a perspective view with portions cut away of the combination frame and fuel tank shown on the motorcycle in FIG. 1.
Figure 3:
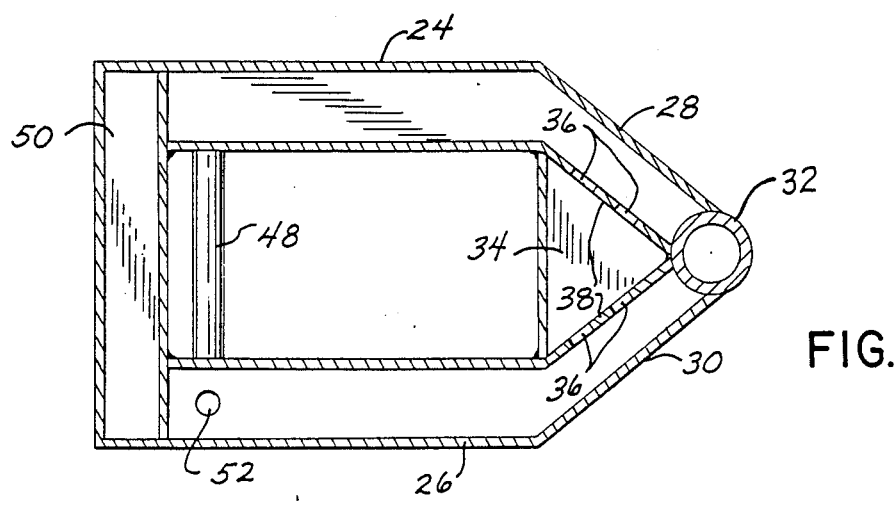
FIG. 3 is a sectional view along the line 3—3 of FIG. 2.

As seen in FIG. 2, dual beam chassis 12 includes a first hollow beam member 24 which forms the left hand side of chassis 12 and a second hollow beam member 26 which forms the right hand side of dual beam chassis 12. Each of beam members 24 and 26 has a forward portion 28 and 30 respectively that extends inwardly to a mounting cylinder 32 which attaches chassis 12 to the front suspension 14.

Dual beam chassis 12 is further provided with a forward hollow cross member 34 in the form of a box-like member having a depth less than that of either beam member 24 or 26. Forward cross member 34 is provided with a plurality of openings 36 in side walls 38 that provide communication between the interior of cross member 34 and the interior of beam members 24 and 26.

Forward cross member 34 is also provided with a fuel filler cap 40 in the form of a conduit 42 that extends upwardly from cross member 34 and is provided with a cap 44. Conduit 42 communicates with the interior of forward cross member 34 so that fuel may be introduced into the interior of the hollow framework.

Conduit 42 is also provided with an atmospheric vent port 46 in the form of an opening and a hollow tube disposed within the side wall of conduit 42.

Chassis 12 is also provided with a second hollow cross member in the form of tube 48 located and connecting the rear portion of cross members 24 and 26. Hollow cross member 48 allows additional fluid communication between beam members 24 and 26. Dual beam chassis 12 is also shown having an additional structural member 50 connecting the rearward ends of beam members 24 and 26. It should be appreciated that this structural member 50 could also be designed as a hollow member located in a lower portion of the framework to replace rear cross member 48 and provide additional fuel capacity.

Right hand beam member includes a fuel outlet port 52 disposed in the bottom wall 54 so that fuel may be removed from the interior of the framework and delivered to engine 22.

Figure 4:
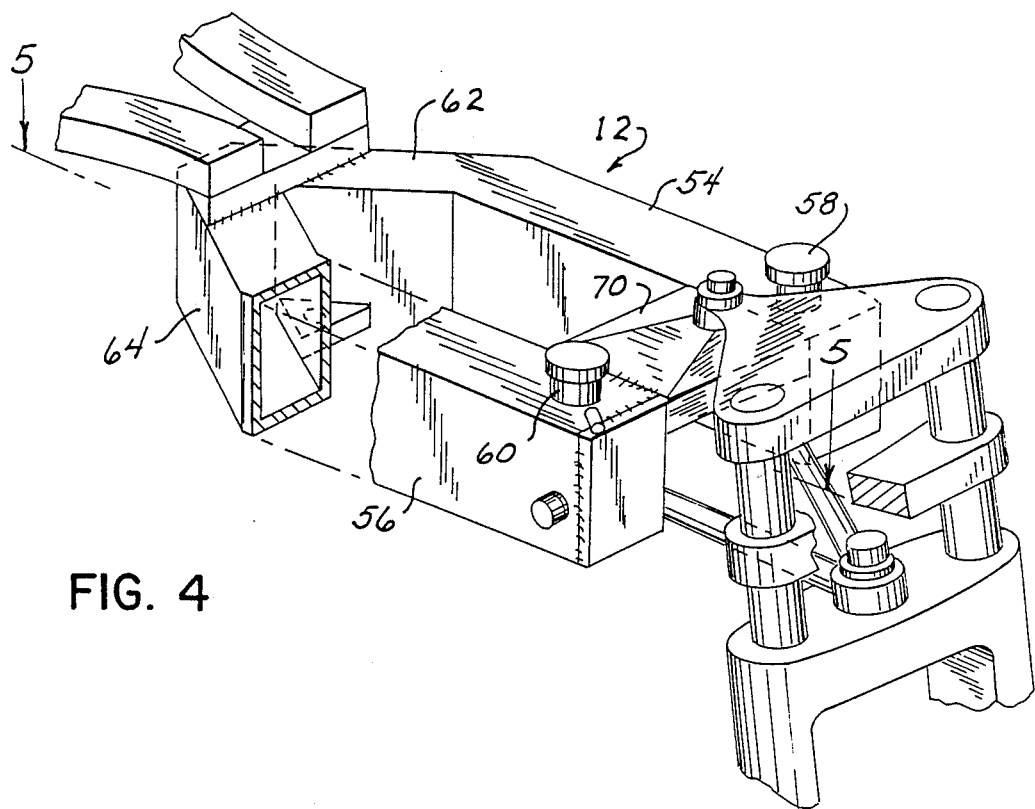
FIG. 4 is a perspective view of an alternate embodiment of the invention.
Figure 5:
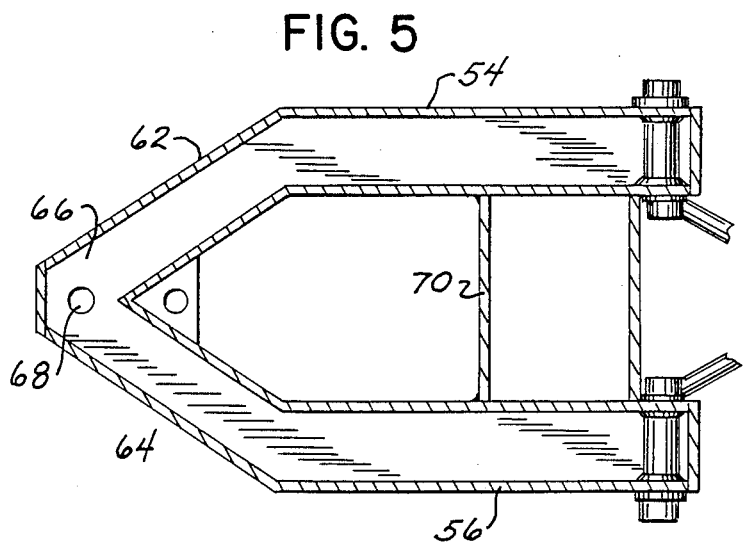
FIG. 5 is a sectional view along the line 5—5 of FIG. 4.

FIGS. 4 and 5 illustrate an alternate embodiment of the combination motorcycle frame and fuel tank in which both left hand frame member 54 and right hand frame member 56 are provided with fuel filler caps 58 and 60 respectively. A vent port 61 is disposed on frame member 56.

In this alternate embodiment, left hand beam member 54 and right hand beam member 56 have rear portions 62 and 64 respectively that extend angularly inwardly and join at a common connecting area 66. Area 66 of chassis 12 is provided with a fuel outlet port 68 that provides fuel to engine 22.

In this alternate embodiment, a structural member 70 is provided at the forward end of chassis 12 between beam members 54 and 56.

The present invention thus provides a combination dual beam chassis and fuel tank that eliminates the need for an external fuel tank mounted on the chassis.

Various modes of carrying out the invention are contemplated as being within the scope of the following claims, particularly pointing out and distinctly claiming the subject matter which is regarded as the invention.

I claim:

1. A combined motorcycle frame and fuel tank comprising:

a first hollow elongated fuel containing beam member comprising one side of a two sided framework for the main chassis of a motorcycle and allowing fluid flow along its length, a second hollow elongated fuel containing beam member comprising the other side of the two sided framework and allowing fluid flow along its length, at least one hollow cross member connecting said first and second beam members and providing fluid communication between the interior of said first and second beam members, said beam members and said cross member defining a space in which at least a portion of the motorcycle engine is disposed, a fuel inlet port disposed in one of said first, second or cross members whereby fuel may be introduced into the interior of said members, and a fuel outlet port disposed in one of said first, second or cross members whereby fuel may be removed from the interior of said members and delivered to the motorcycle engine.

2. The combined motorcycle frame and fuel tank defined in claim 1 comprising a pair of hollow cross members, one of said cross members being disposed at the forward end of said first and second beam members and the other of said cross members being disposed at the rear end of said first and second beam members.

3. The combined motorcycle frame and fuel tank defined in claim 2 wherein said fuel inlet port comprises a capped conduit extending from said forward cross member.

4. The combined motorcycle frame and fuel tank defined in claim 1 wherein said fuel inlet port comprises a capped conduit extending from one of said first or second beam members.

5. The combined motorcycle frame and fuel tank defined in claim 1 further comprising a second fuel inlet port disposed in one of said first or second beam members.

6. The combined motorcycle frame and fuel tank defined in claim 5 wherein said first fuel inlet port comprises a capped conduit extending from one of said first or second beam members and said second fuel inlet port comprises a capped conduit extending from the other of said beam members.

7. The combined motorcycle frame and fuel tank defined in claim 4 wherein an atmosphere vent port is disposed within the fuel inlet port conduit.

8. The combined motorcycle frame and fuel tank defined in claim 2 wherein said forward cross member comprises a box-like member having a depth less than that of either beam members and having a plurality of side wall openings communicating the interior of said box-like member with the interior of said beam members.

9. The combined motorcycle frame and fuel tank defined in claim 2 wherein said rear cross member comprises a tubular member interconnecting the lower portion of said beam members.

* * * * *